United States Patent
Robinson

(10) Patent No.: US 6,928,249 B2
(45) Date of Patent: Aug. 9, 2005

(54) FIBER OPTIC RECEIVER WITH AN ADJUSTABLE RESPONSE PREAMPLIFIER

(75) Inventor: Michael A. Robinson, Fremont, CA (US)

(73) Assignee: Agilent Technologies, Inc., Palo, CA (US)

( * ) Notice: Subject to any disclaimer, the term of this patent is extended or adjusted under 35 U.S.C. 154(b) by 600 days.

(21) Appl. No.: 09/785,051

(22) Filed: Feb. 15, 2001

(65) Prior Publication Data

US 2002/0141022 A1 Oct. 3, 2002

(51) Int. Cl.[7] ................................................. H03F 3/08
(52) U.S. Cl. ......................................... 398/202; 375/317
(58) Field of Search ................................ 398/202, 209; 375/317, 316, 345; 330/305, 294, 278, 308; 455/266

(56) References Cited

U.S. PATENT DOCUMENTS

| | | | |
|---|---|---|---|
| 3,733,514 A | 5/1973 | Garuts | |
| 4,124,817 A | 11/1978 | Takahashi | |
| 4,591,805 A | 5/1986 | Highton | |
| 5,604,927 A | 2/1997 | Moore | |
| 5,673,003 A | 9/1997 | Zocher | |
| 5,864,416 A | 1/1999 | Williams | |
| 6,118,829 A | * 9/2000 | North | 375/317 |
| 6,396,351 B1 | * 5/2002 | Buescher et al. | 330/308 |
| 2002/0076173 A1 | * 6/2002 | Jiang et al. | 385/92 |

\* cited by examiner

Primary Examiner—Jason Chan
Assistant Examiner—David C. Payne

(57) ABSTRACT

A fiber optic receiver that includes an opto-electronic transducer, an adjustable response preamplifier circuit, and a post-amplifier circuit is described. The opto-electronic transducer is configured to generate an electrical data signal in response to a received optical data signal. The adjustable response preamplifier circuit is coupled to the opto-electronic transducer and is operable to amplify an electrical data signal generated by the opto-electronic transducer. The post-amplifier circuit is coupled to an output of the preamplifier circuit and is configured to transmit a mode control signal to the preamplifier circuit in response to a received control signal. By transmitting the mode control signal from the post-amplifier to the preamplifier, the adjustable response amplifier may be placed in the preamplifier stage within a receiver optical sub-assembly (ROSA). As a result, the fiber optic receiver may accommodate multiple operating modes (e.g., multiple bandwidth and power operating modes) while conforming to existing receiver optical sub-assembly (ROSA) size and pin count constraints.

21 Claims, 4 Drawing Sheets

FIBER OPTIC RECEIVER WITH AN ADJUSTABLE RESPONSE PREAMPLIFIER

TECHNICAL FIELD

This invention relates to fiber optic receivers and wideband receiver amplifiers subject to relatively tight packaging constraints.

BACKGROUND

Many advanced communication systems transmit information through a plurality of parallel optical communication channels. The optical communication channels may be defined by a fiber optic ribbon interconnect (or fiber optic cable) formed from a bundle of glass or plastic fibers, each of which is capable of transmitting data independently of the other fibers. Relative to metal wire interconnects, optical fibers have a much greater response, they are less susceptible to interference, and they are much thinner and lighter. Because of these advantageous physical and data transmission properties, efforts have been made to integrate fiber optics into computer system designs. For example, in a local area network, fiber optics may be used to connect a plurality of local computers to centralized equipment, such as servers and printers. In this arrangement, each local computer has an optical transceiver for transmitting and receiving optical information. The optical transceiver may be mounted on a substrate that supports one or more integrated circuits. Typically, each computer includes several substrates that are plugged into the sockets of a common backplane. The backplane may be active (i.e., it includes logic circuitry for performing computing functions) or it may be passive (i.e., it does not contain any logic circuitry). An external network fiber optic cable may be connected to the optical transceiver through a fiber optic connector that is coupled to the backplane.

Fiber optic transceivers typically include a transmitter component and a receiver component. The transmitter component typically includes a laser, a lens assembly, and a circuit for driving the laser. The fiber optic receiver component typically includes a photodiode and a high gain receiver amplifier, which may be operable to perform one or more signal processing functions (e.g., automatic gain control, background current canceling, filtering or demodulation). For one-directional data transfer, a transmitter component is required at the originating end and a receiver component is required at the answering end. For bi-directional communication, a receiver component and a transmitter component are required at both the originating end and the answering end. In some cases, the transmitter circuitry and the receiver circuitry are implemented in a single transceiver integrated circuit (IC). The transceiver IC, photodiode and laser, along with the lenses for the photodiode and the laser are contained within a package that has a size that is sufficiently small to fit within a fiber optic communication device.

SUMMARY

In one aspect, the invention features a fiber optic receiver that includes an opto-electronic transducer, an adjustable response preamplifier circuit, and a mode selection circuit. The opto-electronic transducer is configured to generate an electrical data signal in response to a received optical data signal. The adjustable response preamplifier circuit is coupled to the opto-electronic transducer and is operable to amplify an electrical data signal generated by the opto-electronic transducer. The mode selection circuit is coupled to an output of the preamplifier circuit and is configured to transmit a mode control signal to the preamplifier circuit in response to a received control signal.

Embodiments of the invention may include one or more of the following features.

The mode selection circuit may be configured to transmit the mode control signal to the preamplifier circuit in response to a received data rate control signal or a received power mode control signal.

The mode selection circuit preferably is configured to modulate the mode control signal onto a common line coupled between the preamplifier circuit and the post-amplifier circuit. The mode selection circuit may be configured to modulate the mode control signal onto the common line as a single pulse or as a multiple pulse pattern. In some embodiments, the mode selection circuit is configured to modulate the mode control signal onto the common line as a time-varying signal.

The preamplifier circuit preferably comprises a mode detection circuit that is configured to generate a response control signal for adjusting the response of the preamplifier circuit based upon the mode control signal transmitted by the mode selection circuit.

In some embodiments, the mode detection circuit is configured to detect one or more mode control signal pulses modulated onto a common line coupled between the preamplifier circuit and the mode selection circuit. In these embodiments, the mode detection circuit may be configured to detect the one or more mode control signal pulses based upon a comparison of a common line voltage with a reference voltage.

In other embodiments, the mode detection circuit is configured to detect a time-varying mode control signal modulated onto a common line coupled between the preamplifier circuit and the mode selection circuit. In these embodiments, the mode detection circuit preferably comprises a frequency detector.

The preamplifier circuit may be configured to select one of multiple sets of operating parameters based upon the mode control signal transmitted by the mode selection circuit. For example, the preamplifier circuit may be configured to adjust one or more bandwidth response parameters in response to a bandwidth mode control signal transmitted by the mode selection circuit. Alternatively, the preamplifier circuit may be configured to adjust one or more supply current operating parameters in response to a power mode control signal transmitted by the mode selection circuit.

The mode selection circuit preferably is incorporated within a post-amplifier circuit.

In some embodiments, the fiber optic receiver may include a receiver optical sub-assembly (ROSA) comprising a fiber optic connector for coupling to a mating connector of a fiber optic cable. The preamplifier circuit may be incorporated within the ROSA. The ROSA and the post-amplifier circuit may be mounted on a common substrate.

Among the advantages of the invention are the following.

By transmitting the mode control signal from the mode selection circuit to the preamplifier, the adjustable response amplifier may be placed in the preamplifier stage within a receiver optical sub-assembly (ROSA). As a result, the fiber optic receiver may accommodate multiple operating modes (e.g., multiple bandwidth and power modes) while conforming to existing receiver optical sub-assembly (ROSA) size and pin count constraints. This feature enables the analog electrical data signals generated by the opto-electronic transducer to be amplified, filtered, and shaped optimally for data recovery, while allowing the receiver to be housed within a package sized to fit within fiber optic communication devices with significant size constraints.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
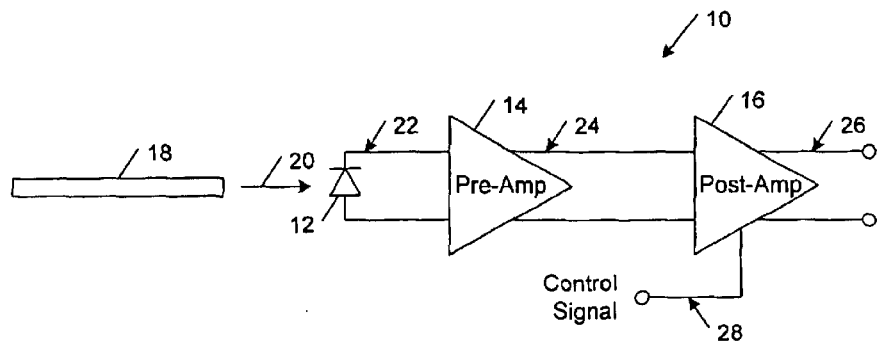
FIG. 1 is a diagrammatic view of a fiber optic receiver, which includes an opto-electronic transducer, a preamplifier circuit and a post-amplifier circuit, and a fiber optic cable carrying an optical data signal to the fiber optic receiver.

Referring to FIG. 1, in one embodiment, a fiber optic receiver 10 includes an opto-electronic transducer 12 (e.g., a p-i-n photodiode), an adjustable response preamplifier circuit 14, and a post-amplifier circuit 16. In operation, a fiber optic cable 18 carries an optical data signal 20 to opto-electronic transducer 12. In response to optical data signal 20, opto-electronic transducer 12 generates an electrical data signal 22, which is amplified by preamplifier circuit 14. Preamplifier circuit 14 is configured to amplify electrical data signal 22 over a prescribed range of optical power for optical data signal 20. The resulting pre-amplified electrical data signal 24 is further amplified by post-amplifier circuit 16, which amplifies and shapes electrical data signal 24 so that data embedded in output signal 26 may be extracted by a conventional clock and data recovery circuit.

As explained in detail below, preamplifier circuit 14 has an adjustable response that may be set by a control signal 28 (e.g., a data rate control signal or a power mode control signal) that is received by post-amplifier circuit 16. Post-amplifier circuit 16 transmits a corresponding mode control signal to preamplifier circuit 14 to optimize the performance of fiber optic receiver 10 for different operating conditions. For example, in one embodiment, when the data rate of the received optical data signal 20 is high, the cutoff frequency of preamplifier 14 may be set high (e.g., about 1.5 GHz to about 2.5 GHz), whereas when the data rate is low, the cutoff frequency of preamplifier circuit 14 may be set low (e.g., about 0.5 GHz to about 1.5 GHz). In this embodiment, the data rate of optical data signal 20 may be known a priori or may be extracted by a phase-locked loop or other techniques in the clock and data recovery circuit or in the post-amplifier circuit 16. In some embodiments, both preamplifier circuit 14 and post-amplifier circuit 16 have adjustable responses.

Figure 2A:
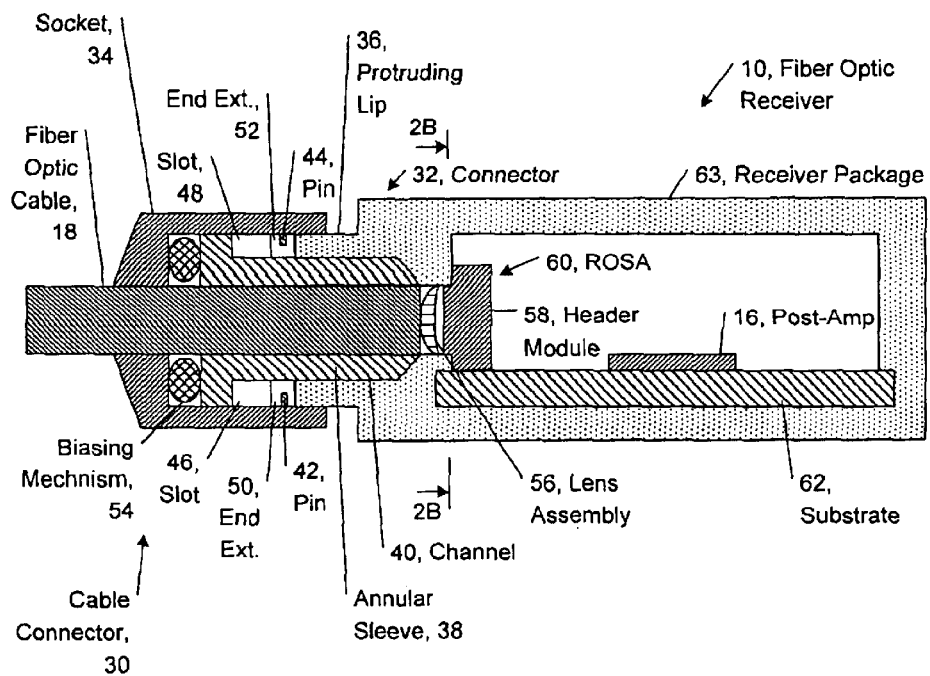
FIG. 2A is a diagrammatic cross-sectional side view of a fiber optic cable coupled by a pair of mating connectors to a receiver optical sub-assembly (ROSA) of the fiber optic receiver of FIG. 1.

As shown in FIG. 2A, in one embodiment, fiber optic cable 18 includes a cable connector 30 that couples to a mating receiver connector 32 of fiber optic receiver 10. Cable connector 30 includes a socket 34 that is configured to slide over a protruding lip 36 of receiver connector 32. An annular sleeve 38 is disposed about the distal end of fiber optic cable 18 and is configured to slide within a channel 40 defined within receiver connector 32. Socket 34 has a pair of pins 42, 44 that are slidable within vertical slots 46, 48 of lip 36. Socket 34 may be slid over lip 36, with pins 42, 44 aligned with slots 46, 48, until pins 42, 44 reach the ends of slots 46, 48. Socket 34 then may be rotated to seat pins 42, 44 in end extensions 50, 52 of slots 46, 48. The process of seating pins 42, 44 within end extensions 50, 52 compresses a biasing mechanism 54 (e.g., a rubber o-ring) that urges socket 34 against receiver connector 32, effectively locking cable connector 30 to receiver connector 32. When properly seated within channel 40, the one or more fibers of fiber optic cable 18 are aligned with a lens assembly 56, which focuses optical data signals 20 onto opto-electronic transducer 12.

Figure 2B:
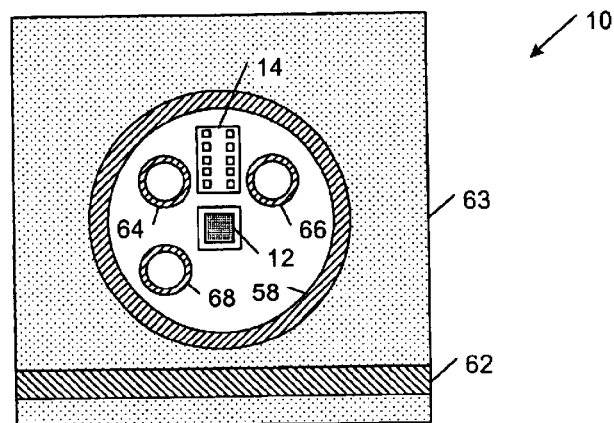
FIG. 2B is a diagrammatic cross-sectional end view of a header module of the ROSA of FIG. 2A taken along the line 2B—2B.

Referring to FIG. 2B, opto-electronic transducer 12 and preamplifier circuit 14 are housed within a header module 58 of a receiver optical sub-assembly (ROSA) 60, which is mounted on a substrate 62 (e.g., a printed circuit board or other support for passive and active components) of fiber optic receiver 10. ROSA 60 and substrate 62 are contained within a receiver package 63. Opto-electronic transducer 12 is mounted centrally within ROSA 60 to receive optical data signals that are carried by fiber optic cable 18 and focused by lens 56. ROSA 60 also includes a plurality of insulated posts 64, 66, 68, which define channels through which electrical connectors extend to couple substrate 62 to opto-electronic transducer 12 and preamplifier circuit 14.

Other embodiments may use fiber optic connectors that are different from the bayonet-type connectors 30, 32 to couple fiber optic cable 18 to receiver 10. Receiver 10 may be housed within a standalone receiver package or may be housed together with a transmitter component in a transceiver package.

Figure 3:
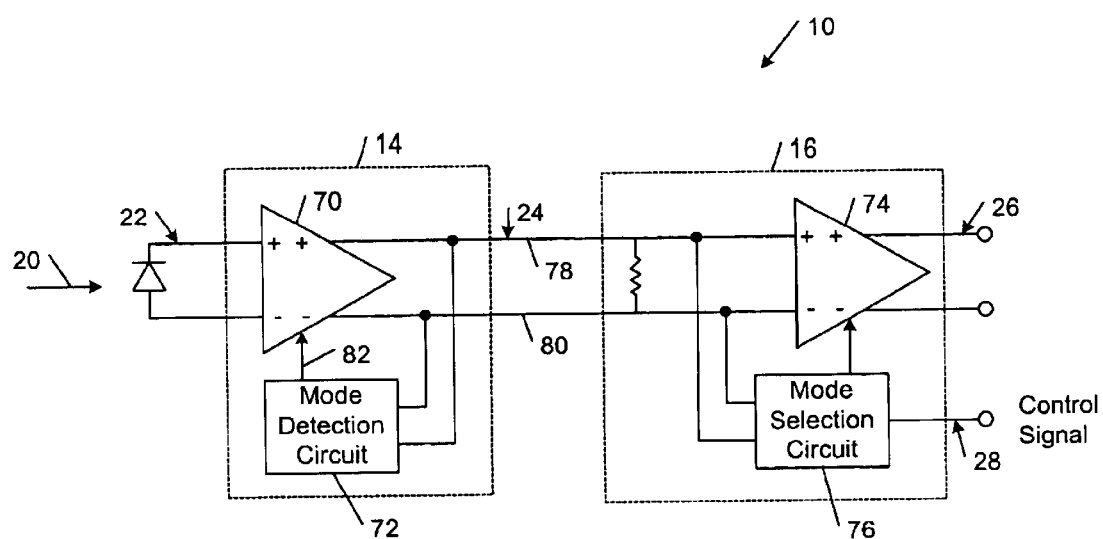
FIG. 3 is a circuit diagram of the fiber optic receiver of FIG. 1.

Referring to FIG. 3, in one embodiment, preamplifier circuit 14 includes an adjustable response high gain amplifier 70 and a mode detection circuit 72. Post-amplifier circuit 16 includes a high gain amplifier 74 and a mode selection circuit 76. In some embodiments, mode selection circuit 76 may be implemented as a circuit that is separate from post-amplifier circuit 16. In response to a received control signal 28, mode selection circuit 76 generates a mode control signal, which is transmitted to preamplifier circuit 14. In one embodiment, mode selection circuit 76 is configured to transmit the mode control signal over data lines 78, 80 (i.e., data, data-bar). In another embodiment, mode selection circuit 76 is configured to transmit the mode control signal to preamplifier circuit 14 over a power line that is coupled between preamplifier circuit 14 and post-amplifier circuit 16. In general, mode selection circuit 76 may be configured to transmit the mode control signal to preamplifier circuit 14 over one or more common lines that are coupled between preamplifier circuit 14 and post-amplifier circuit 16. Mode detection circuit 72 is configured to detect the mode control signal that is transmitted by mode selection circuit 76 and to generate a response control signal 82 for adjusting the response (or signal processing characteristics) of amplifier 70, including the bandwidth, gain, noise, and time response of amplifier 70. Bias levels and passive element values (e.g., resistance, capacitance and conductance values) may be varied, as well as other techniques, to achieve a desired frequency and time domain characteristic behavior of amplifier 70.

The response of amplifier 70 may be adjusted in different ways.

For example, the bandwidth response may be adjusted by varying the bias conditions of a variable transconductance transistor in the preamplifier circuit. Alternatively, the bandwidth response may be adjusted by varying the bias voltage applied to a varactor (voltage-variable capacitor) in the preamplifier circuit. The bandwidth response also may be adjusted by varying capacitance values or resistance values in low-pass filters coupled to the signal paths through the preamplifier circuit. The bandwidth response alternatively may be adjusted by varying the gain of an amplifier within preamplifier circuit 14.

In some embodiments, the operating power parameters of amplifier 70 may be adjusted based upon response control signal 82. For example, control signal 28 may correspond to a power mode signal (e.g., a power-up mode signal, power-down mode signal, or sleep or standby mode signal). In this case, mode selection circuit 76 transmits a power mode control signal to mode detection circuit 72. In response, mode detection circuit 72 generates a power response control signal 82 that is configured to set the operating power mode of amplifier 70.

Amplifier 70 may have a continuously variable response or a discrete variation in response. A continuously variable amplifier response may be achieved by incrementing or decrementing the amplifier characteristics based upon each pulse detection. Similar results may be achieved by counting each time a frequency is detected. The amplifier response also may be varied based upon pulse amplitude modulation or the actual frequency of the mode control signal.

Figure 4:
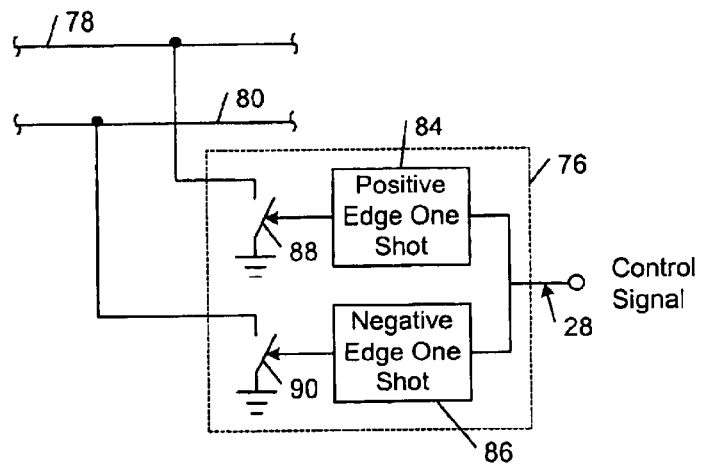
FIG. 4 is a circuit diagram of a post-amplifier mode selection circuit.
Figure 5A:
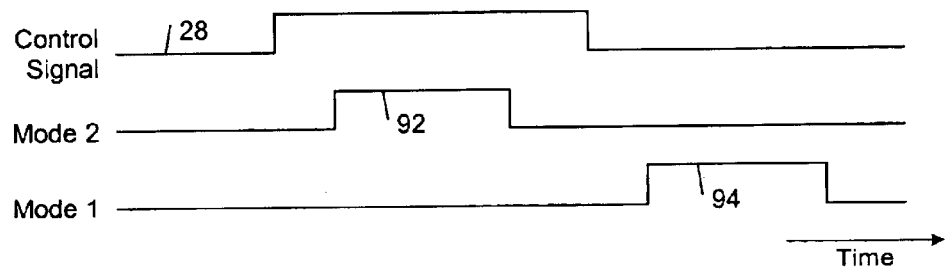
FIG. 5A is a diagrammatic view of a data rate control signal, a positive edge-triggered one-shot output signal, and a negative edge-triggered one-shot output signal, each plotted as a function of time.
Figure 5B:
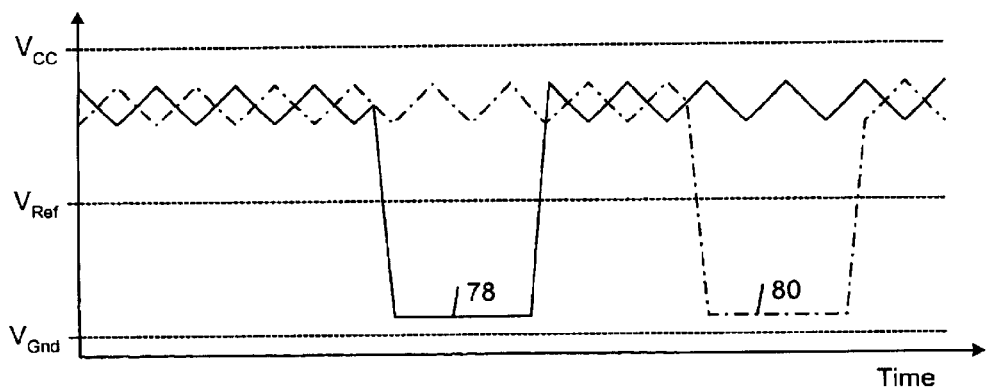
FIG. 5B is a graph of voltage values on the data lines of the fiber optic receiver of FIG. 1 plotted as a function of time.

Referring to FIG. 4, in one embodiment, mode selection circuit 76 is configured to transmit the mode control signal as a single pulse modulation over data lines 78, 80. In this embodiment, mode selection circuit 76 includes a positive edge-triggered one-shot 84, a negative edge-triggered one-shot 86 and a pair of pull down switches 88, 90, which are configured to selectively pull the voltages on data lines 78, 80 close to ground potential. Positive edge-triggered one-shot 84 and negative edge-triggered one-shot 86 may be implemented in a conventional way (e.g., with NAND gates and inverters). Pull down switches 88, 90 may be implemented by conventional transistors that are large enough to pull down the voltages on data lines 78, 80 substantially below the reference voltage (e.g., close to ground potential).

As shown in 5A and 5B, in operation, control signal 28 may have a low value for a first mode of operation (Mode 1) that may correspond to a low data rate (or a first power mode), and a high value for a second mode of operation (Mode 2) that may correspond to a high data rate (or a second power mode). When the value of control signal 28 switches from low to high, positive edge-triggered one-shot 84 generates a pulse 92 that closes switch 88, which pulls down data line 78 close to ground potential ($V_{Gnd}$). When the value of control signal 28 switches from high to low, negative edge-triggered one-shot 86 generates a pulse 94 that closes switch 90, which pulls down data-bar line 80 close to ground potential ($V_{Gnd}$).

Figure 6:
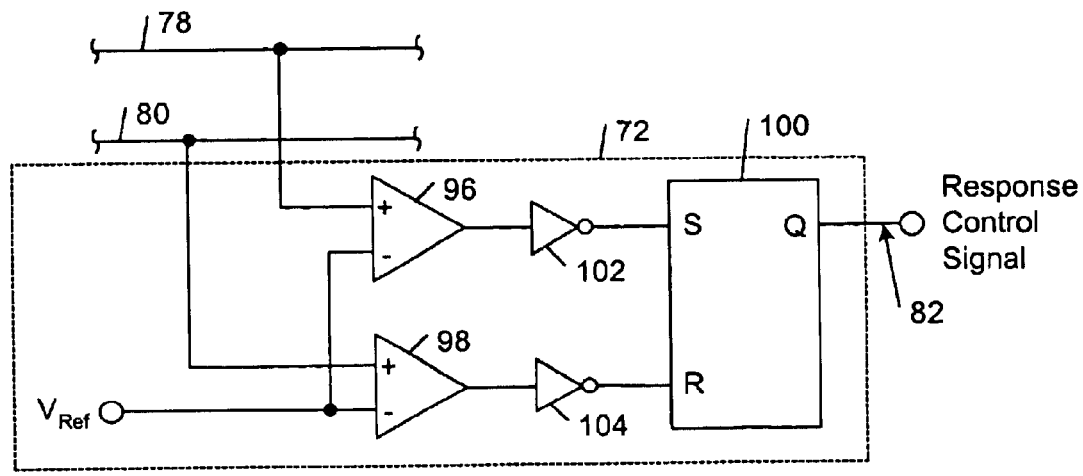
FIG. 6 is a circuit diagram of a preamplifier mode detection circuit.

Referring to FIG. 6, in one embodiment, preamplifier mode detection circuit 72 is configured to detect the single pulse modulations on data line 78 and data-bar line 80 based upon a comparison of the data line voltages with a reference voltage ($V_{Ref}$). The reference voltage has a value between ground potential and the normal operating range of electrical data signals 24 (e.g., $V_{cc}$–0.5 volts to $V_{cc}$–0.25 volts, where $V_{cc}$ corresponds to the positive supply voltage). Mode detection circuit 72 includes a pair of comparators 96, 98 that have negative inputs coupled to the reference voltage and positive inputs coupled to data lines 78, 80, respectively. The outputs of comparators 96, 98 are coupled through a pair of inverters 102, 104 to the set (S) and reset (R) inputs of an SR latch 100, respectively. In operation, the outputs of comparators 96, 98 are low only when data lines 78, 80 are pulled below the reference voltage. Accordingly, when data line 78 is pulled below $V_{Ref}$, SR latch 100 is set to a value of 1. When data-bar line 80 is pulled below $V_{Ref}$, on the other hand, SR latch 100 is set to a value of 0. In this way, the operating condition information contained in control signal 28 may be transmitted from post-amplifier circuit 16 to preamplifier circuit 14 in the form of a single pulse modulation on data line 78 or data-bar line 80, or both. The response of amplifier 70 may be adjusted in one or more of the ways described above based upon the response control signal 82 produced at the output of SR latch 100.

Other embodiments are within the scope of the claims.

For example, in some embodiments, mode selection circuit 76 may be configured to modulate the mode control signal onto one or more common lines coupled between preamplifier circuit 14 and post-amplifier circuit 16 as a multiple pulse pattern, rather than as a single pulse. In these embodiments, mode detection circuit 72 may include a decoder or other circuit configured to generate an appropriate response control signal 82 corresponding to the response mode specified by the multiple pulse mode control signal pattern.

Figure 7:
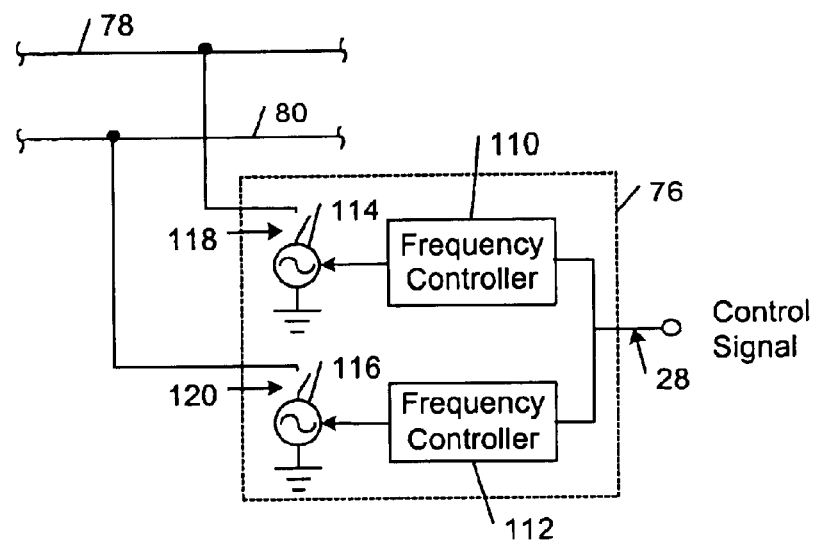
FIG. 7 is a circuit diagram of an alternative post-amplifier mode selection circuit.

In other embodiments, mode selection circuit 76 may be configured to modulate the mode control signal onto one or more common lines that are coupled between preamplifier circuit 14 and post-amplifier circuit 16 as a time-varying signal. For example, referring to FIG. 7, in one embodiment, mode selection circuit 76 may include a pair of frequency controllers 110, 112, each of which is coupled to a respective adjustable frequency voltage source 114, 116. Voltage sources 114, 116 are selectively coupled to data lines 78, 80 by a pair of switches 118, 120 and are configured to modulate a time varying mode control signal onto the data signals carried by lines 78, 80. In operation, frequency controllers 110, 112 set the frequency of voltage sources 114, 116 based upon the value (or state) of control signal 28. The frequencies set by frequency controllers 110, 112 may be the same or different. In accordance with this embodiment, a large number of different response modes may be selected to accommodate a corresponding number of different operating conditions. For example, four different response modes may be established by selectively setting each of voltage sources 114, 116 to have one of two different frequencies ($f_1$, $f_2$), as illustrated in Table 1 below.

TABLE 1

| Data Rate Control Signal State | Data Line 78 Frequency | Data Line 80 Frequency | Response Mode |
| --- | --- | --- | --- |
| 1 | $f_1$ | $f_1$ | $R_1$ |
| 2 | $f_2$ | $f_1$ | $R_2$ |
| 3 | $f_1$ | $f_2$ | $R_3$ |
| 4 | $f_2$ | $f_2$ | $R_4$ |

In this embodiment, mode detection circuit 72 preferably includes a pair of frequency detectors that are configured to resolve the frequencies of the time-varying mode control signals modulated onto data lines 78, 80.

In some embodiments, mode selection circuit 76 may be configured to modulate the mode control signal onto one or more common lines that are coupled between preamplifier circuit 14 and post-amplifier circuit 16 as an amplitude modulated signal. In these embodiments, mode selection circuit 76 may include a pair of frequency sources that are capable of producing amplitude modulated output signals. Mode detection circuit 72 preferably includes a corresponding pair of amplitude demodulators that are configured to resolve the amplitude variations modulated onto the mode control signals transmitted by mode selection circuit 76.

Still other embodiments are within the scope of the claims.

What is claimed is:

1. A fiber optic receiver, comprising:
    a receiver optical sub-assembly (ROSA) comprising a lens assembly, and housing an opto-electronic transducer configured to generate an electrical data signal in response to a received optical data signal and an adjustable response preamplifier circuit electrically coupled to the opto-electronic transducer and operable to amplify an electrical data signal generated by the opto-electronic transducer; and
    a mode selection circuit located outside of the ROSA and electrically coupled to an output of the preamplifier circuit and configured to transmit a mode control signal to the preamplifier circuit in response to a received control signal.

2. The fiber optic receiver of claim 1, wherein the mode selection circuit is configured to transmit the mode control signal to the preamplifier circuit in response to a received data rate control signal.

3. The fiber optic receiver of claim 1, wherein the mode selection circuit is configured to transmit the mode control signal to the preamplifier circuit in response to a received power mode control signal.

4. A fiber optic receiver, comprising:
    an opto-electronic transducer configured to generate an electrical data signal in response to a received optical data signal;
    an adjustable response preamplifier circuit electrically coupled to the opto-electronic transducer and operable to amplify an electrical data signal generated by the opto-electronic transducer;
    a post-amplifier circuit electrically coupled to the preamplifier circuit; and
    a mode selection circuit electrically coupled to an output of the preamplifier circuit and configured to transmit a mode control signal to the preamplifier circuit in response to a received control signal, wherein the mode selection circuit is configured to modulate the mode control signal onto at least one common line coupled between the preamplifier circuit and the post-amplifier circuit.

5. The fiber optic receiver of claim 4, wherein the mode selection circuit is configured to modulate the mode control signal onto the at least one common line as a single pulse.

6. The fiber optic receiver of claim 4 wherein the mode selection circuit is configured to modulate the mode control signal onto the at least one common line as a multiple pulse pattern.

7. The fiber optic receiver of claim 4, wherein the mode selection circuit is configured to modulate the mode control signal onto the at least one common line as a time-varying signal.

8. The fiber optic receiver of claim 1, wherein the preamplifier circuit comprises a mode detection circuit configured to generate a response control signal for adjusting the response of the preamplifier circuit based upon the mode control signal transmitted by the mode selection circuit.

9. The fiber optic receiver of claim 4, further comprising a mode detection circuit configured to generate a response control signal for adjusting the response of the preamplifier circuit based upon the mode control signal transmitted by the mode selection circuit, wherein the mode detection circuit is configured to detect one or more mode control signal pulses modulated onto the at least one common line onto which the mode control signal is modulated.

10. The fiber optic receiver of claim 8, wherein the mode detection circuit is configured to detect the one or more mode control signal pulses based upon a comparison of a common line voltage with a reference voltage.

11. The fiber optic receiver of claim 8, wherein the mode detection circuit is configured to detect a time-varying mode control signal modulated onto a common line coupled between the preamplifier circuit and the mode selection circuit.

12. The fiber optic receiver of claim 11, wherein the mode detection circuit comprises a frequency detector.

13. The fiber optic receiver of claim 1, wherein the preamplifier circuit is configured to select one of multiple sets of operating parameters based upon the mode control signal transmitted by the mode selection circuit.

14. The fiber optic receiver of claim 13, wherein the preamplifier circuit is configured to adjust one or more bandwidth response parameters in response to a bandwidth mode control signal transmitted by the mode selection circuit.

15. The fiber optic receiver of claim 13, wherein the preamplifier circuit is configured to adjust one or more supply current operating parameters in response to a power mode control signal transmitted by the mode selection circuit.

16. The fiber optic receiver of claim 1, wherein the mode selection circuit is incorporated within a post-amplifier circuit.

17. The fiber optic receiver of claim 1, wherein the ROSA comprises a fiber optic connector for coupling to a mating connector of a fiber optic cable.

18. The fiber optic receiver of claim 1, wherein the ROSA and the post-amplifier circuit are mounted on a common substrate.

19. A fiber optic receiver, comprising:
    a substrate;
    a receiver optical sub-assembly (ROSA) mounted on the substrate and comprising a fiber optic connector for coupling to a mating connector of a fiber optic cable;

an opto-electronic transducer incorporated within the ROSA and configured to generate an electrical data signal in response to a received optical data signal;

an adjustable response preamplifier circuit incorporated within the ROSA, coupled to the opto-electronic transducer, and operable to amplify an electrical data signal generated by the opto-electronic transducer; and a post-amplifier circuit mounted on the substrate, coupled to an output of the preamplifier circuit, and configured to transmit a mode control signal to the preamplifier circuit over one or more common lines coupled between the preamplifier circuit and the post-amplifier circuit in response to a received data rate control signal.

20. The fiber optic receiver of claim 4, wherein at least one common line onto which the mode control signal is modulated is a line selected from: a data signal line and a power line.

21. The fiber optic receiver of claim 19, wherein at least one common line onto which the mode control signal is modulated is a line selected from: a data signal line and a power line.

* * * * *